July 10, 1951 P. F. SMITH 2,559,804
PARACHUTE
Filed Nov. 12, 1947 2 Sheets-Sheet 1

INVENTOR.
Prevost F. Smith

July 10, 1951 P. F. SMITH 2,559,804
PARACHUTE
Filed Nov. 12, 1947 2 Sheets-Sheet 2

INVENTOR.
Prevost F. Smith

Patented July 10, 1951

2,559,804

UNITED STATES PATENT OFFICE 2,559,804

PARACHUTE

Prevost F. Smith, San Diego, Calif.

Application November 12, 1947, Serial No. 785,371

21 Claims. (Cl. 244—152)

This invention relates to a parachute that automatically changes shape as the velocity decreases, for the purpose of obtaining a low coefficient of drag (Cd) at high speed and in the initially opened position and then a high coefficient of drag (Cd) at low speed as the object to be supported by the parachute has been decelerated. More particularly, experiments to date with one model show that while it will support a 50 pound weight at 15 miles per hour descent, the pull at 105 miles per hour is approximately only 300 pounds, where with a conventional parachute it would be about 2500 pounds. Thus at high speed, as the parachute is first deployed and opens, its coefficient of drag is only .15, but after decelerating the load to a safe low speed, the Cd becomes 1.2. Further the parachute lends itself to change in adjustment so as to accomplish desired results with various loads and speeds, although the above change in Cd remains about the same. For example a 400 pound robot missile on the above mentioned model would have an estimated drag of 5000 pounds at 425 miles per hour, yet would safely descend at 42 miles per hour after decelerating. A conventional parachute giving the same rate of descent would have an opening shock load approaching 40,000 pounds.

The principal object of this invention is to produce a parachute that will be unable to exert a high drag at high speed.

Another object is for said parachute to produce a high drag at low speeds comparable to conventional standard parachute.

A third object is to eliminate oscillation particularly at high speed.

With these and other objects in view as will appear hereinafter, my invention consists of certain novel features of construction, combination and arrangement of parts and portions, as will be hereinafter described in detail and particularly set forth in the appended claims, reference being had to the accompanying drawings and other characters of reference thereon forming a part of this application in which:

Fig. 9 is a full size side view of the automatic control shown in Fig. 7 with one of the side covers removed showing the arrangement of the suspension webs and the locking means while

Similar characters of reference refer to similar parts and portions throughout the several views of both the simple and more complex illustrated variations of the parachute.

Figure 1:
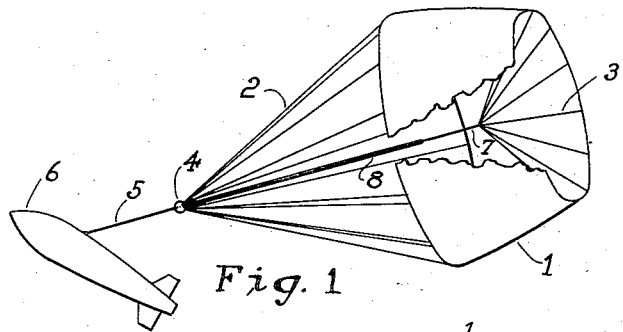
Fig. 1 is a fragmentary side elevational view of the simpler form of this parachute shown decelerating a missile from very high speeds in which the fabric takes the shape of a "lampshade" (technically the frustrum of a cone) thereby relieving all excess pressure since the vent is almost as big as the mouth of the parachute. This shape can also be called a conical parachute with a large vent.
Figure 2:
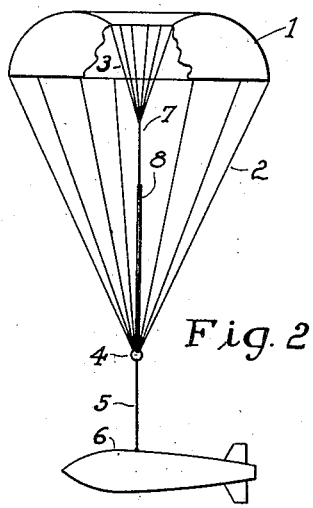
Fig. 2 is a fragmentary side view of the same after the speed has decreased to a minimum thereby the vent is almost closed and the Cd is very high.

As shown in Fig. 1, the fabric is formed as the frustum of a cone so that the diameter of the mouth of the parachute is slightly larger than the vent. Also the proportions are such that the diameter is about double the height. The fabric is suitably reinforced at the edge of both mouth and vent so that the outside suspension lines 2, and the inside suspension lines 3, may be securely sewed thereto at suitable intervals consistent with the strength of the line and the maximum design velocity load. The lines 2, are tied to a common ring 4, to which a cable 5, connects to the load 6, to be supported 6. The inside lines 3, whose lengths are preferably equal the radius of the mouth of the parachute, tie to a common heavy line 7, that is in turn fastened to the top end of a length of elastic shock cord whose lower end is tied to the ring 4 and whose length is sufficient to easily operate between the vent fully opened and closed position. Thus at high speeds, the air blast, in creating a large force against the vent of the parachute, extends the elastic 8, by means of the vent lines 3 and 7. Then as the load 6 is decelerated, the elastic 8 retracts the vent down and inwards thereby trapping the air and producing a shape as shown in Fig. 2 that has about the same Cd as a standard conventional parachute. They have shown that the parachute illustrated in Fig. 1 is 100% stable with no oscillation at any speed.

Figure 3:
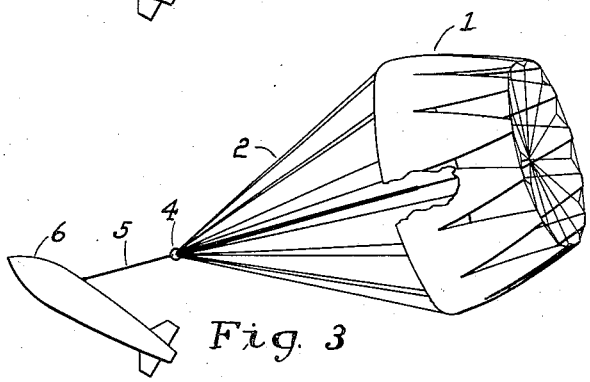
Fig. 3 is a fragmentary side elevation view of a modification of this parachute shown decelerating a missile from very high speed in which the fabric takes the shape of a "crown" thereby removing unnecessary material and further reducing the Cd at high speed.

Fig. 3 is a modification of the above design in which a further reduction in drag at high speed is obtained and also a reduction in the quantity of fabric used so that at low speeds, the Cd is as high or higher than that of a conventional parachute based upon an equal quantity of fabric. In this design, the shape is still a frustrum of a cone but the appearance is like a crown, as illustrated by the portion shown in Fig. 4. The skirt to which the lines 2 are attached is a portion of a cylinder 1a, whose height is about 1/6th the diameter. To this are sewed the longer base sides of a series of regular trapezoids 1b, whose sizes are such to produce a shape similar to Fig. 1 in the open position and Fig. 2 in the closed position. In the upper reinforced corners of each trapezoid are inserted grommets 9, through which loops 10, on the ends of the inside lines 3 are passed. These loops are of such a size that they fully permit the vent to open wide at high speed as in Fig. 4 and in combination with the lines 3 have a diameter about the same as the mouth of the parachute so that a very large ratio exists between the force pulling the vent closed and the force of the elastic 8. More specifically a very small force from the elastic exerts a very strong force to close the vent. Thus as the velocity of the load decreases the peaks of the trapezoids are pulled together and down forming a regular parachute thereby effecting a high Cd to obtain a low rate of descent, as shown in Fig. 5 and in the enlarged portion of a top view Fig. 6.

Figure 4:
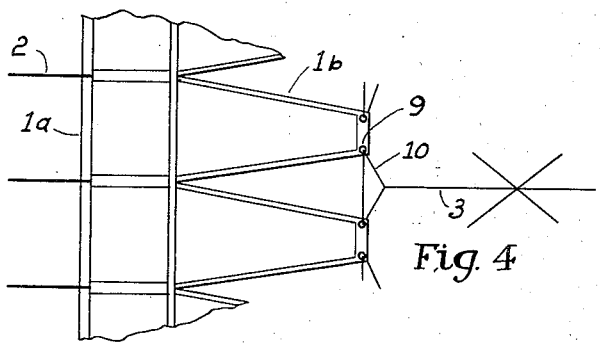
Fig. 4 is an enlarged side view of the panels on the crown parachute taken from Fig. 3 as the vent is in the high speed wide open position.
Figure 5:
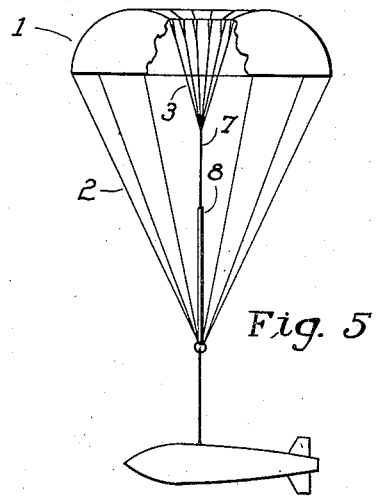
Fig. 5 is a side view of the same after the speed has decreased to a minimum thereby the vent is almost closed and the Cd is at its maximum.
Figure 6:
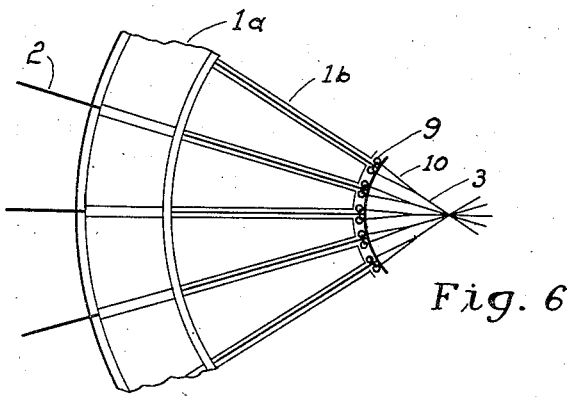
Fig. 6 is an enlarged view of a section of the panels taken from Fig. 5 showing the panels held together, closing the vent and causing the maximum Cd.
Figure 7:
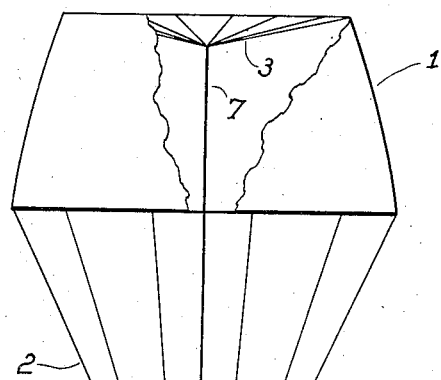
Fig. 7 is a fragmentary view of the "lampshade" canopy with a modification of the automatic control shown in the wide open high speed position.
Figure 8:
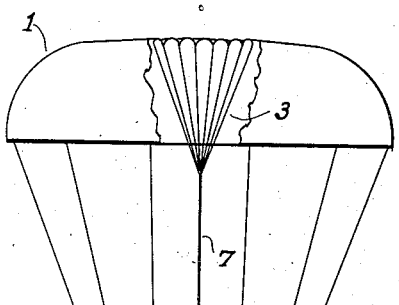
Fig. 8 is a fragmentary view of the same "lampshade" canopy with the modified automatic control shown in the closed, low speed, condition.
Figure 9:
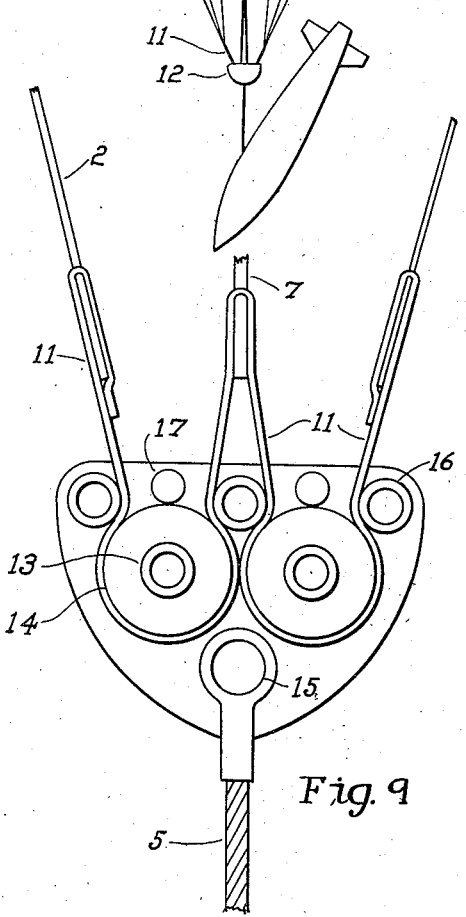
Figure 10:
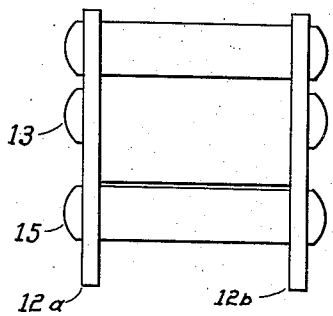
Fig. 10 is an end view of the same without the suspension webs.

The structure of the modified control means shown in Figs. 7, 8, 9 and 10 consists of nonelastic means of automatically closing the parachute vent as the velocity is decreased and operates by a displacement of the inside lines 2 to the outside lines 3, caused by the greater tension of the outside lines than the inside lines when using the grommets spaced about the vent and loops on the ends of the inner suspension lines 2 as illustrated in Figs. 4 and 6. To facilitate such displacement of the lines, the outside suspension lines on opposite sides of the parachute are attached to two pieces of webbing whose lengths are about 1/6 the diameter of the parachute and whose other ends join and attach to the center line 7 so that in the wide open position the webs are high on the inside of the parachute. The webs transfer their tension to the load to be supported through cables 5 and a braking device 12 that automatically prevents the said displacement of the lines until the velocity has decreased. Referring to Figs. 9 and 10, this braking device consists of a cage with two vertical members 12a and 12b in which two axles 13 are horizontally disposed between, upon which are mounted two freely rotating resilient rollers 14 under which the webs 11 are looped. A lower horizontally disposed pin 15, through the frame 12 and 12a holds the braking device to the load 6 through the cable 5. Other locking pins 16, are disposed above the rollers 14 with knurled faces so that the webbing is threaded between them and the rollers 14. Two other pins 17, with knurled faces are positioned just above the resilient rollers 14 so that as the parachute is first deployed at very high speeds in the vent fully open position, the drag pulls on the webs 11 over the resilient rollers which are deflected against the pins 17 and also the webbing is jammed against the pins 16 thus effecting a positive lock to hold the parachute in that open position until the velocity has substantially decreased. Then the resilient rollers assume their normal shape and release from the pins 16 and 17 permitting the displacement of the webbing from the inside to the outside since in the fully opened position, tests have verified the design theory that the inside load on the line 7 is but a small fraction of the load on the outside lines and even as the displacement becomes complete at a low speed, the load on the inside line 7 is still only 2/5 of the total load. Thus there is always a positive differential of force to effect the displacement of the web so as to close the parachute vent. The ends of the web 11 are turned so as to act as stops in order to limit the travel over the rollers 14 between the two desired conditions of the parachute.

While I have shown and described the particular construction, combination and arrangement of parts and portions of the principal embodiment with two modifications of my invention, I do not wish to be limited to this particular construction, combination and arrangement of parts and portions in the principal embodiment and modification but do desire to include in the scope of my invention the construction, combination and arrangement substantially as set forth in the appended claims.

Having thus described my invention, what I claim as new and desire to secure by Letters Patent is:

1. A conical parachute of the class described, suspension lines secured to the skirt of said canopy, inner suspension lines arranged in conjunction with the vent so that the tension on the outer suspension lines is substantially greater than that of the said inner lines, a cage attached to the load to be supported, an axle through said cage, a resilient roller adapted to freely rotate on said axle, a webbing secured to the ends of said inner and outer suspension lines and passing under said roller, stationary locking means adjacent said roller adapted to lock said roller against rotation when excess tension of the said webbing due to an excessive high speed deflects said resilient roller against said locking means thereby holding the vent open until deceleration has reduced the load thereby releasing said resilient roller from said locking means permitting the roller to rotate and the lines to be displaced pulling the vent down and inwards to effect a low rate of descent.

2. A conical parachute of the class described, suspension lines secured to the skirt and inner suspension lines arranged in conjunction with the vent of said canopy so that the tension on the said outer suspension lines is substantially greater than that of the said inner lines, a cage attached to the load to be supported, a roller adapted to freely rotate in said cage, a webbing secured to the ends of said inner and outer suspension lines and passing under said roller, stationary locking means adjacent said roller adapted to lock said roller against rotation due to excess tension of the said webbing at excessive high speed, thereby preventing movement of said webbing around said roller, thereby holding the vent open until deceleration has reduced the load thereby releasing said locking means to permit the said roller to rotate and the lines to be displaced, pulling the vent down and inwards to effect a low rate of descent.

3. A conical parachute of the class described, suspension lines secured to the skirt of said canopy, inner suspension lines arranged in conjunction with the vent so that the tension on the outer suspension lines is substantially greater than that of the said inner lines, a webbing on the ends of said inner and outer lines, a load supporting roller over the said webbing so adapted as to transfer the tension of said webbing to the load to be supported, means to lock said roller to prevent its rotation when the opening shock load of said parachute exceeds a designed maximum, thereby preventing movement of said webbing over said roller to prevent the displacement of the inside lines downwards and the outside lines upwards thereby holding the said vent open until the deceleration has reduced the load thereby releasing said locking means permitting said displacement so that the vent is pulled down and inwards trapping the air to effect a low rate of descent.

4. A conical parachute of the class described, suspension lines secured to the skirt of said canopy, inner suspension lines arranged in conjunction with the vent so that the tension on the outer suspension lines is substantially greater than that of the said inner lines, a webbing on the ends of said inner and outer lines, a load supporting roller over which said webbing is engaged to transfer the tension of said webbing to the load to be supported, whereby deployment of the parachute will cause the displacement of the said inner lines down and the said outer lines up so that the vent is pulled down and inwards trapping the air to effect a low rate of descent.

5. A conical parachute of the class described, suspension lines secured to the skirt of said canopy, inner suspension lines secured to the vent of said canopy and extending radially inwards of the vent, the length of the portion of the suspension lines extending inwards of the vent being approximately equal to the radius of the vent, suspension means attached to said inner suspension lines, means to change the length of said suspension means so as to allow the vent to fully open at high speed while pulling the vent down and inwards to trap the air at low speed.

6. A conical parachute of the class described, outer suspension lines secured to the skirt of said canopy, a plurality of grommets placed in the vent of said canopy, inner suspension lines with loops on the upper ends that pass through said grommets and extending radially inwards of the vent, the length of the portion of the suspension lines extending inwards of the vent being approximately equal to the radius of the vent, a suspension means attached to said inner suspension lines, means to change the length of said suspension means so as to allow the vent to open wide at high speed while pulling the vent down and inwards to trap the air at low speed.

7. A conical parachute of the class described, outer suspension lines secured to the skirt of said canopy, a plurality of grommets placed in the vent of said canopy, inner suspension lines with loops on the upper ends that pass through said grommets, a suspension means attached to said inner suspension lines, means to change the length of said suspension means so as to allow the vent to open wide at high speed while pulling the vent down and inwards to trap the air at low speed.

8. A parachute of the class described having a skirt which is essentially the section of a cylinder, a plurality of trapezoidal canopy portions whose bases are secured in sequence about the upper periphery of said skirt, grommets in the upper portion of said trapezoidal canopy portions, inner suspension lines with loops on the ends that pass through said grommets and extend radially inwards of the vent and of such length as to approximately equal the radius of the expanded vent, means to shorten the length of the inner suspension lines so as to allow the vent to fully open at high speed while pulling the vent down and inwards to trap the air at low speeds.

9. A parachute of the class described having a skirt which is essentially the section of a cylinder, a plurality of trapezoidal canopy portions whose bases are secured in sequence about the upper periphery of said skirt, grommets in the upper portion of said trapezoidal canopy portions, inner suspension lines with loops on the ends that pass through said grommets, means to shorten the length of the inner suspension lines so as to allow the vent to fully open at high speed while pulling the vent down and inwards to trap the air at low speeds.

10. A parachute of the class described having a skirt which is essentially the section of a cylinder, a plurality of trapezoidal canopy portions whose bases are secured in sequence about the upper periphery of said skirt, grommets in the upper portion of said trapezoidal canopy portions, inner suspension lines that pass through said grommets, means to shorten the length of the inner suspension lines so as to allow the vent to fully open at high speed while pulling the vent down and inwards to trap the air at low speeds.

11. A parachute having a central vent, suspension lines attached to the skirt of said parachute, inner lines attached to the vent of said parachute, a flexible suspension member connecting said suspension lines and said inner lines, a cage attached to a load to be supported, an axle through said cage, a resilient roller adapted to be freely rotatable on said axle, a locking pin mounted fixed in the cage above said roller, the said suspension member movably engaging said roller to transfer the load of the said parachute to said cage, guide pins through said cage so positioned as to hold the said suspension member in close contact with said roller, whereby an excessive speed and load of said parachute causes the said resilient roller to oblate and jamb against said locking pin and binding the said suspension member between the said roller and said guide pins, thereby the said roller ceases to rotate and the said suspension member ceases to move around said rollers until deceleration has reduced the load thereby releasing said resilient roller from said locking pins permitting the said suspension member to move around said roller and pull the vent down to effect a low rate of descent.

12. A parachute of the class described, suspension lines attached to the skirt of said parachute, inner lines attached to the vent of said parachute, a flexible suspension member connecting said suspension lines and said inner lines, a cage attached to the load to be supported, an axle through said cage, a resilient roller adapted to freely rotate on said axle, the said suspension member movably engaging said roller to transfer the load of the said parachute to the said cage, locking means in connection with said roller so adapted as to prevent the rotation of the said roller when the load of the parachute is excessive, thereby preventing the movement of the said suspension member to pull the vent down until the speed and load has decreased.

13. A parachute of the class described, suspension lines attached to the skirt of said parachute, inner lines attached to the vent of said parachute, a flexible suspension member connecting said suspension lines and said inner lines, a cage attached to the load to be supported, an axle through said cage, a roller on said axle, the suspension member movably engaging said roller to transfer the load of the said parachute to the said cage, resilient locking means in connection with said roller so adapted as to prevent the rotation of said roller when the load of the parachute is excessive thereby preventing the movement of the said suspension member to pull the vent down until the speed and load has decreased.

14. A parachute of the class described, suspension lines attached to the skirt of said parachute, inner lines attached to the vent of said parachute, a flexible suspension member connecting said suspension lines and said inner lines, a cage attached to the load to be supported, an automatically deflectable member extending through said cage, the said suspension member engaging said deflectable member to transfer the load of the said parachute to the said cage, guide pins through said cage to hold the said suspension member in close contact with said deflectable member, an excessive load of the parachute to deflect said deflectable member binding the said suspension member to prevent its movement around said deflectable member until deceleration reduces the load thereby releasing the said suspension member to move around said deflectable member, pulling the vent down to effect a low rate of descent.

15. A parachute of the class described, suspension lines attached to the skirt of said parachute, inner lines attached to the vent of said parachute, a flexible suspension member connecting said suspension lines and said inner lines, a cage attached to the load to be supported, an automatically deflectable member extending through said cage, the said suspension member movably engaging said deflectable member to transfer the load of the parachute to said cage, guide pins in relation to said deflectable member so disposed that the said suspension member is held in close contact to said deflectable member, an excessive load of the parachute to deflect said deflectable member so that the said suspension member is retarded from moving around said deflectable member until deceleration reduces the load thereby releasing the said suspension member to move around the said deflectable member, pulling the vent down to effect a low rate of descent.

16. A parachute of the class described, suspension lines attached to the skirt of said parachute, inner lines attached to the vent of said parachute, a flexible suspension member connecting said suspension lines and said inner lines, a cage attached to the load to be supported, an automatically deflectable member mounted in said cage, the said suspension member engaging said deflectable member to transfer the load of the parachute to said cage, guide pins in relation to said deflectable member so disposed that the said suspension member is held in close contact to said deflectable member, whereby an excessive load of the parachute to deflect said deflectable member so that the said suspension member is retarded from moving relative to said deflectable member until deceleration reduces the load, thereby automatically releasing the said suspension member to move around the said deflectable member pulling the vent down to effect a low rate of descent.

17. A parachute of the class described, suspension lines attached to the skirt of said parachute, inner lines attached to the vent of said parachute, a flexible suspension member connecting said suspension lines and said inner lines, a cage attached to the load to be supported, a deflectable member mounted in said cage, the said suspension member engaging said deflectable member to transfer the load of the parachute to said cage, a guide pin mounted in said cage so disposed in relation to the said deflectable member that an excessive load of the parachute will bind the said suspension member preventing its movement around said deflectable member and past said guide pin until deceleration reduces the load thereby releasing the said suspension member to move around said deflectable member pulling down the vent to effect a low rate of descent.

18. A parachute of the class described, suspension lines attached to the skirt of said parachute, inner lines attached to the vent of said parachute, a flexible suspension member connecting said suspension lines and said inner lines, a cage attached to the load to be supported, a deflectable member mounted in said cage, the said suspension member engaging said deflectable member to transfer the load of the parachute to said cage, locking means mounted in said cage so disposed in relation to said deflectable member and said suspension member that an excessive load of the parachute will prevent the movement of said suspension member around said deflectable member until deceleration reduces the load, thereby releasing the said suspension member to move around said deflectable member, pulling the vent down to effect a low rate of descent.

19. A parachute, suspension lines attached to the skirt of said parachute, inner lines attached to the vent of said parachute, a flexible suspension member connecting said suspension lines and said inner lines, a cage attached to the load to be supported, means including resilient locking means mounted in said cage for slideably retaining said suspension member, whereby an excess load causes said locking means to prevent the movement of said suspension member through said cage until the load has decreased.

20. A parachute, suspension lines attached to the vent of said parachute, a flexible suspension member connecting said suspension lines and said inner lines, a cage attached to the load to be supported, means including resilient locking means mounted in said cage to moveably suspend said suspension member in said cage, whereby an excess load causes said locking means to prevent the movement of said suspension member through said cage until the load has decreased.

21. In a parachute, a canopy having a central opening, inner lines connected to the canopy around the perimeter of said opening, said inner lines connected to a common flexible suspension means, said canopy having an outer skirt, outer lines connected to the perimeter of said skirt and secured to the opposite ends of said common flexible suspension means from said inner lines, an automatic friction operated locking load supporting device, having deflecting portions over which said flexible suspension means passes intermediate said inner and outer lines, said deflecting portions tending to frictionally lock said suspension means during extreme drag of said parachute, and tending to relieve the same during decreased drag thereof, said inner lines during said decreased drag movable toward said device for correspondingly closing said opening and extending said skirt diametrically, whereby the angle of said outer lines relative to the axis of said parachute automatically changes correspondingly and progressively and intermittently, said outer lines unrestricted intermediate said device and said skirt to permit the angular change and permit corresponding angular force components to act on said skirts for diametrically extending the same and closing said opening.

PREVOST F. SMITH.

REFERENCES CITED

The following references are of record in the file of this patent:

UNITED STATES PATENTS

| Number | Name | Date |
|---|---|---|
| 1,519,857 | Lucas | Dec. 16, 1924 |
| 2,235,657 | Thornblad | Mar. 18, 1941 |
| 2,308,797 | Nasca | Jan. 19, 1943 |

FOREIGN PATENTS

| Number | Country | Date |
|---|---|---|
| 417,048 | Germany | July 23, 1921 |